March 10, 1970  R. J. PATTERSON  3,499,799
PROCESS FOR PREPARING DENSE, ADHERENT BORON NITRIDE
FILMS AND CERTAIN ARTICLES OF MANUFACTURE
Filed June 2, 1964  3 Sheets-Sheet 1

INVENTOR.
Robert J. Patterson
BY
E. Mickey Hubbard
Attorney

March 10, 1970 R. J. PATTERSON 3,499,799
PROCESS FOR PREPARING DENSE, ADHERENT BORON NITRIDE
FILMS AND CERTAIN ARTICLES OF MANUFACTURE
Filed June 2, 1964 3 Sheets-Sheet 2

INVENTOR.
Robert J. Patterson
BY
E. Mickey Hubbard
Attorney

INVENTOR.
Robert J. Patterson
BY
E. Mickey Hubbard
Attorney

United States Patent Office 3,499,799
Patented Mar. 10, 1970

3,499,799
PROCESS FOR PREPARING DENSE, ADHERENT BORON NITRIDE FILMS AND CERTAIN ARTICLES OF MANUFACTURE
Robert J. Patterson, Dallas, Tex., assignor to Texas Instruments Incorporated, Dallas, Tex., a corporation of Delaware
Continuation-in-part of application Ser. No. 330,123, Dec. 12, 1963. This application June 2, 1964, Ser. No. 374,558
Int. Cl. C23c *11/00;* B44d *1/34*
U.S. Cl. 148—6.3     19 Claims

ABSTRACT OF THE DISCLOSURE

Disclosed is a process for adherently depositing a thin film of boron nitride on a metal substrate, including the steps of forming a metal boride interlayer on the surface of the substrate and then depositing boron nitride on the interlayer in such a manner that the interlayer chemically bonds the boron nitride film to the substrate. These films may be used as protective coatings on refractory metals, as insulative coatings on electrical conductors, as dielectrics in capacitors, and wherever stable, inert films are desired.

---

The present invention relates to the preparation of thin boron nitride films and more particularly, but not by way of limitation, relates to a process for adherently depositing thin boron nitride films on metal substances for manufacturing insulated conductors, capacitors and the like and to certain articles manufactured by the process.

This is a continuation-in-part application of my copending application Ser. No. 330,123, filed Dec. 12, 1963, now abandoned, entitled "Process for Preparing Dense, Adherent Boron Nitride Films and Certain Articles of Manufacture," which is about to be abandoned in favor of this application.

Pure and dense boron nitride has outstanding dielectric properties, is stable in most corrosive agents, is stable against oxidation even at high tempeartures, and is not wet by many molten materials. Therefore, boron nitride is a highly useful product, especially if it can be prepared as a thin film which is strongly adherent to the surface of an object, and is uniform, continuously dense and flexible. For example, one very useful application of boron nitride films is in the field of dielectrics, either as insulation for a conductor or as the dielectric in a capacitor.

It is well known in the art that capacitance is directly proportional to the area of the opposed electrodes and inversely proportional to the thickness of the dielectric between the electrodes. The voltage at which a capacitor may be operated is determined by the breakdown voltage of the dielectric. Since it is desirable to have capacitors of minimum size, yet of maximum capacitance and maximum breakdown voltage, various attempts have been made to produce very thin dielectrics for use in capacitors having high insulation values. Capacitors using boron nitride as the dielectric have been constructed. Substantially all of these capacitors have been constructed by what might be termed "bulk" techniques in that the dielectric layer is constructed by working a mass of boron nitride down to a thin sheet. For example, solid boron nitride has been successfully machined down to a thickness on the order of 25 mils and then placed between suitable electrodes such as metal films painted on the opposite surfaces of the thin sheet. Or, powdered boron nitride has been combined with suitable binding material and subjected to high pressure and high temperature to form a relatively thin pressed dielectric sheet.

In the first instance, the minimum thickness of the machined boron nitride is limited by the machining process, except by means of very costly techniques, to a minimum thickness of about 25 mils as compared with an optimum thickness of substantially less than about one mil. In the second case, the intermixed binders and other additives appreciably decrease the insulation properties of the boron nitride. Further, the minimum thickness attainable in the latter case is limited by the fact that small areas in which no boron nitride is present are produced. Therefore, as the sheet is pressed thinner, some areas between the electrodes do not have any boron nitride present and the capacitor shorts out or has a low breakdown voltage.

Other attempts to construct very thin film dielectrics for use in capacitors have entailed the production of a metal oxide film or other metal compound film on a metal substrate. While these capacitors are suitable for some purposes, metal ions must diffuse into the metal oxide dielectric being formed in order to carry out the oxidation reaction. This results in a metal ion gradient throughout the film which appreciably reduces the dielectric quality of the film.

More recently, it has been suggested that boron nitride can be deposited directly upon a metal substrate by the thermal decomposition of trichloroborazole and that the boron nitride deposited in this manner could be used for electrical capacitors. However, it has been found that boron nitride cannot be deposited directly upon a metal substrate to produce a thin, continuously dense film which is strongly adherent to the metal substrate so as to be used to manufacture electrical devices, and in particular, the quality and thickness of the film could not be sufficiently controlled for commercial application.

Copper and many of its alloys are generally considered to be the best and most economical electrical conductors. In nearly all cases where copper is used as an electrical conductor, suitable insulation must be applied over the surface of the copper to prevent shorting. Many different organic and inorganic materials have been used as insulation for copper conductors. In general, the organic materials are mechanically unsound and deteriorate at relatively low temperatures, particularly if only thin coats are used. The inorganic insulations tend to crack on bending, are usually difficult to prepare without pinholes and, therefore usually must be coated with a second material to protect against moisture and to reduce the deleterious effects of cracking. Sometimes other metals are clad over copper to prevent oxidation of the copper and then the conventional insulation materials applied. Another common technique consists of coating the copper with a slurry comprised of an organic enamel and ceramic or glass particles. The coating is then fired to sinter the particles into a continuous insulating film and drive off the organic portion of the slurry. Then an organic coating, such as Teflon, is applied as an overcoat. Another common technique is to coat the copper with aluminum, then anodize the aluminum to form a thin insulating film of alumina around the copper.

It is often desirable to use electrical conductors at temperatures substantially above 200° C., but prolonged use of most conductors at these temperatures results in damage to the insulation or the oxidation of the copper. It is desirable for the insulating coats to be thin so as to save space, particularly when using the conductors for motor and transformer windings, or the like. Thin boron nitride films have excellent dielectric, thermal, mechanical and chemical properties for use as an electrical insulator and, if adherently applied to a flexible substrate, protect the substrate from oxidation and are flexible. However, it is extremely difficult to adherently apply a continuous, pinhole-free film of dense boron nitride to a copper substrate because of inherent incompatibilities in the lattice structures and coefficients of thermal expansion, and various other reasons.

In general, the process of the present invention comprises the steps of forming an interlayer on the surface of a substrate and then depositing the boron nitride film on the interlayer in such a manner that the interlayer chemically bonds the boron nitride film to the substrate.

In one specific embodiment of the invention, the interlayer is a boron compound of the substrate metal so that the interlayer will have chemical elements common to both the substrate and the boron nitride film, and the substrate is taken from refractory metals in general, and specifically from the group comprised of molybdenum, tungsten, niobium, tantalum and base alloys of each, and ferrous base alloys.

The present invention also contemplates a process for adherently applying a thin film of boron nitride to the surface of a metal other than those mentioned, and in particular to the surface of copper or copper alloys. The process is comprised of first depositing a thin film of a refractory metal on the surface of the substrate metal, forming an interlayer on the surface of the refractory metal by reacting a reagent with the metal, then depositing a thin film of boron nitride on the interlayer to produce a novel article of manufacture comprised of a conductive metal substrate, a first interlayer of refractory metal bonded to the substrate, a second interlayer bonded to the first metal interlayer, and a thin film of boron nitride bonded to the second interlayer.

In accordance with a more specific aspect of the invention, a thin film of molybdenum is deposited on the surface of the copper, then the surface of the molybdenum film is borided prior to the deposition of the thin film of boron nitride. The resulting article is a copper or copper alloy conductor having good electrical characteristics, coated by a thin film of boron nitride which is adherently bonded to the copper by first and second interlayers of molybdenum and molybdenum boride and which is a superior insulator, is flexible, and has outstanding mechanical, chemical and thermal stability at temperatures up to about 700° C.

Therefore, an important object of this invention is to provide an improved process for depositing substantially pure boron nitride on a substrate.

Another object of this invention is to provide a process for depositing a strongly adherent film of boron nitride on a substrate.

Yet another object of this invention is to provide a process for depositing a very thin, very dense, very uniform and continuous boron nitride film on a substrate object.

Still another object of this invention is to provide a process for depositing boron nitride on refractory metal substrates and the like for protecting the substrate object from otherwise deleterious environments such as oxidation and corrosive agents at extreme temperatures.

Another object of this invention is to provide an improved insulated electrical conductor which is flexible, is protected from oxidation at elevated temperatures, is resistant to most corrosive agents and is stable in vacuums.

Another object of this invention is to provide an article of manufacture which is not wet by many molten materials and which may be used to handle the molten materials such as glass.

Yet another object of the present invention is to provide an intermediate process for manufacturing a capacitor which has a high capacitance and a high operating voltage, yet which is very small in size.

A still further object of this invention is to provide an intermediate process for manufacturing a capacitor which is very stable over a wide temperature range.

Yet another object of the invention is to provide an intermediate process for manufacturing a capacitor which is very stable over extended periods of time.

A still further object of the present invention is to provide a process for manufacturing a capacitor which can be operated at high temperatures without danger of a voltage breakdown.

Another object of the invention is to provide a capacitor which can be operated at high temperatures, in the presence of corrosive agents, or in high vacuums.

Another object of the present invention is to provide a process for adherently bonding a thin, continuous film of boron nitride to the surface of a metal to which the boron nitride could not normally be applied directly.

Yet another object of the present invention is to provide a process of the type described for adherently applying an insulating film of boron nitride to a copper or copper alloy conductor.

Still another object of the present invention is to provide a conductor fabricated primarily of a relatively economical metal, such as copper, insulated by a thin film of boron nitride adherently bonded to the conductor.

Yet another object of the present invention is to provide an improved electrical conductor comprised of copper or copper alloy insulated by boron nitride.

Yet another object of the present invention is to provide a process for manufacturing an improved insulated electrical conductor or the like which can be used at higher temperatures without deleterious effects on the insulation, which is chemically stable in many adverse environments, which is flexible, and which has a smaller overall diameter.

Many additional advantages and uses of the present invention will be evident to those skilled in the art from the following detailed description and drawings, wherein.

In accordance with the broader aspects of the present invention, an interlayer is used to chemically bond a thin film of boron nitride to a substrate. The interlayer is formed by reacting a reagent with the substrate to form a boride, nitride, oxide or other compound of the substrate which will chemically bond with a boron nitride film subsequently deposited on the interlayer. The novel process is believed to be applicable to a wide variety of substrate materials and in particular to substantially all refractory metals which will withstand the temperatures used in the process, and is specifically applicable to molybdenum, niobium, tantalum, tungsten and to alloys comprised primarily of these metals, and to certain ferrous base alloys.

In a specific embodiment of the invention, boron is reacted with a metal substrate to produce a metal boride interlayer. The boron may be supplied by reacting boron trichloride vapor with the surface of a heated substrate.

In accordance with the broader aspects of this invention, the boron nitride film may be formed by the reaction of boron and nitrogen from suitable source reagents on a heated substrate upon which the interlayer has been formed. In a specific embodiment, however, the boron nitride film is deposited by the thermal decomposition of beta-trichloroborazole on a heated substrate. Or the boron and nitrogen may be supplied by boron trichloride and ammonia.

The formation of the interlayer and the deposition of the boron nitride film are preferably accomplished in separate steps so that a uniform interlayer is assured over the entire surface to be coated. A uniform boron nitride layer can then be deposited and the thickness of the film rather precisely controlled. However, the two steps can be accomplished simultaneously by supplying a mixture of boron trichloride and trichloroborazole vapors at the surface of a heated substrate.

Figure 1:
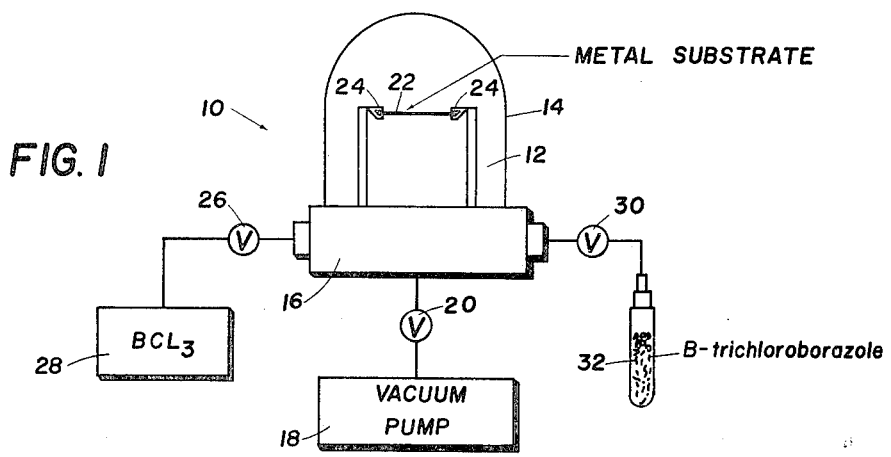
FIGURE 1 is a schematic drawing of an apparatus which may be used to practice the method of the present invention.

A suitable apparatus for performing the process of the present invention is indicated generally by the reference numeral 10 in FIGURE 1. The apparatus 10 comprises a reaction chamber 12 formed by a bell jar 14 and a base 16. The reaction chamber 12 can be evacuated by a suitable pump 18. A valve 20 is provided for sealing the reaction chamber from the pump when desired. A metal substrate 22 upon which the boron nitride film is to be deposited is held by suitable clamps 24 through which an electrical current can be passed to heat the substrate. A valve 26 controls the introduction of boron trichloride vapors into the reaction chamber 12 from a suitable boron trichloride source 28. A similar valve 30 controls the introduction of trichloroborazole vapors to the reaction chamber 12 from a trichloroborazole source 32 which may conveniently comprise a vacuum container in which trichloroborazole crystals can be heated and vaporized. In the event boron trichloride and ammonia are used for the deposition of the boron nitride film, the valve 30 can be used to control the introduction to the reaction chamber 12 of ammonia or the vapors of the addition compound ammonia-boron trichloride which has previously been formed by a reaction between boron trichloride and ammonia.

When using the apparatus 10 to practice the process of the present invention, the metal substrate 22 is preferably degreased by a suitable solvent prior to placement in the reaction chamber 12. Next, the reaction chamber 12 is evacuated by the pump 18 to a very low pressure, preferably less than about one micron of mercury. The substrate 22 may then be heated in the vacuum to sublimate all volatile impurities which are purged from the system by the vacuum pump 18. Next the reaction chamber 12 is backfilled with boron trichloride from the source 28 to the desired pressure, which is preferably between about 5 and about 500 microns of mercury. The substrate 22 is then resistively heated to a temperature in the range from about 700° to about 1700° C. for a short period of time, usually from about 15 to about 60 seconds. During this period the metal boride interlayer is formed upon the surface of the metal substrate 22 by the interaction of the metal and the boron from the boron trichloride vapors.

The reaction chamber 12 is then evacuated to a low pressure of about one micron of mercury in order to remove the remaining boron trichloride vapors and the freed chlorine. The reaction chamber 12 is then backfilled with beta-trichloroborazole vapors to a pressure between about 10 microns to about 20 millimeters of mercury. Next the substrate 22 is heated to a temperature between about 700° C. and about 1700° C. until a film of boron nitride of the desired thickness is achieved. A period from about 1 to about 5 minutes is normal. The thickness of the film can be rather precisely determined by controlling the various parameters of pressure, temperature and contact time between the vapors and the substrate. Boron nitride films from 0.2 micron to 5 microns have been prepared. The film can be made so thin and of such uniform thickness as to be substantially one color if the substrate is uniformly heated.

Using the above described process, boron nitride films of various thicknesses were deposited upon molybdenum wire having a diameter of 10 mils. The adherence of the film to the wire substrate was determined by simple bending tests. Although the precise thicknesses of the film were not measured, the thicknesses of the films were indicated by the DC breakdown voltage determined by using a ball-shaped contact to apply the voltage to the boron nitride film. The permissible bend diameters and breakdown voltages are tabulated below in Table I. As the thickness of the boron nitride film increases, flexibility diminishes and the minimum permissable bend diameter and breakdown voltage increase.

TABLE I

Permissible bend diameter vs. breakdown voltage

| Bend diameter, inches: | Volts |
| --- | --- |
| 1/8 | 150 |
| 1/4 | 250 |
| 1/2 | 1100 |
| 1 | 1400 |

The boron nitride films are chemically stable in a wide variety of corrosive media. Specifically, the boron nitride films are insoluble in $H_2O$, HCl (dilute and concentrated), $HNO_3$ (dilute and concentrated), $H_2SO_4$ (dilute and concentrated), aqua regia, NaOH, KOH (dilute and concentrated), cryolite mixtures, and HF (dilute and concentrated). The boron nitride films are stable in air up to 700° C., but are unstable above 800° C. after 30 minutes. Negligible loss of boron nitride by evaporation occurred when the film was held at 900° C. in a vacuum of 0.01 micron of mercury. From the above data relating to the flexibility, insulative properties and chemical stability at elevated temperatures, it will be evident that the strongly adherent, thin boron nitride films are highly useful as insulation in various adverse environments. The boron nitride films also exhibit the property of not being wet by some molten metals including silver, gold, zinc, and some molten glasses including borosilicates. Accordingly, the boron nitride films prepared by the above process should be useful in protecting vessels and other equipment used in handling these molten materials.

Figure 3:
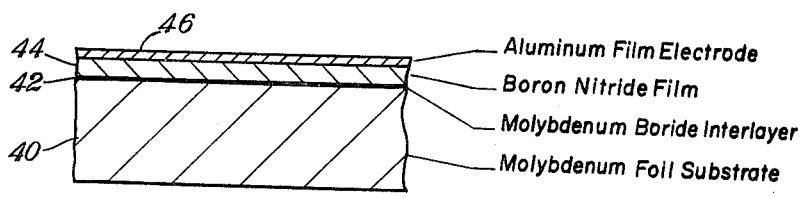
FIGURE 3 is an enlarged, partial sectional view of a capacitor constructed in accordance with the present invention.

Referring now to FIGURE 3, in accordance with another aspect of the present invention, a novel and highly useful electrical capacitor is manufactured by depositing a very thin boron nitride film 44 on a metal substrate 40 using the interlayer 42 to chemically bond the film to the substrate as above described, and then depositing a metallic counterelectrode 46 on the dielectric boron nitride film 44.

Figure 4:
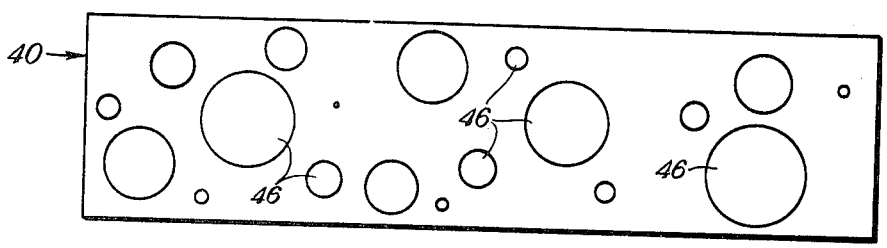
FIGURE 4 is a somewhat schematic plan view which serves to illustrate the manner in which the results of the method of the present invention were tested.

In order to test the continuity and uniformity of a boron nitride film and to construct a capacitor, a molybdenum foil substrate 40 was placed in the reaction chamber 12 shown in FIGURE 1. A molybdenum boride interlayer 42 and a boron nitride film 44 were then deposited on the molybdenum substrate using the process described above. A series of randomly-placed aluminum electrodes 46 of progressively increasing diameters as illustrated in FIGURE 4 were then vacuum-evaporated onto the surface of the boron nitride film using conventional techniques. The aluminum film electrodes 46 had successively increasing areas up to 1.208 square inches. The breakdown voltage of the boron nitride film between each of the electrodes 46 and the metal substrate was uniformly about 500 volts DC. This indicates that the boron nitride is very uniform and continuously dense over the entire substrate since any defect in the boron nitride film under any electrode would result in a decrease in the breakdown voltage.

Further tests of capacitors constructed in accordance with the present invention indicated that a 0.5 micron thick boron nitride film has a dielectric strength of 5000 DC volts per mil ($2\times10^6$ DC volts per centimeter) and a dielectric constant of 4.4. Thus a boron nitride film one micron thick can be expected to have a breakdown voltage of 200 DC volts and a capacitance of 25,000 micro micro farads per square inch. The DC voltage breakdown tests referred to above correspond to Method 301 of the procedures outlined in Mil–std–202 and represent the ability of the boron nitride film to withstand an impressed DC voltage over a period in excess of one minute.

Figure 5:
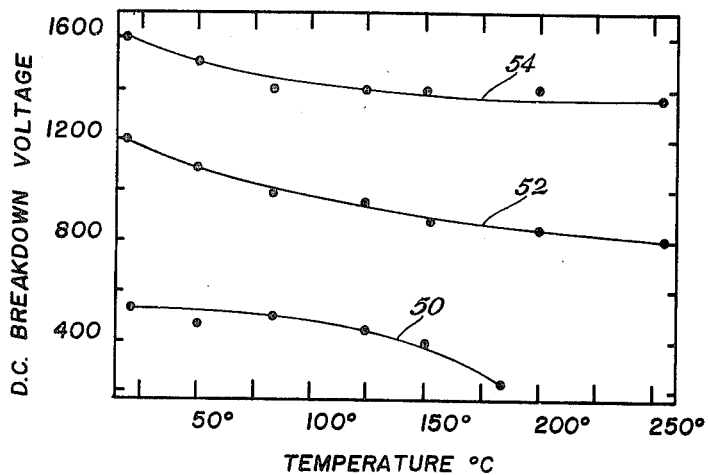
FIGURE 5 is a graph illustrating an operating characteristic of three capacitors constructed in accordance with the present invention.

The variations in breakdown voltage for three separate capacitors constructed in accordance with the present invention are represented by the curves 50, 52 and 54 on the graph of FIGURE 5. The boron nitride film of the capacitor represented by the curve 52 was thicker than the boron nitride coating of the capacitor represented by the curve 50, and the boron nitride film of the capacitor represented by the curve 54 was still thicker. The voltage measurements were made in a dry nitrogen ambient by making a point contact to the aluminum film electrode deposited on the boron nitride film. Considering some inaccuracies in the breakdown voltage measurements, it will be evident that no large changes in the rate of degradation of the breakdown voltages with temperature occurs with decreasing film thicknesses up to about 150° C. where the breakdown voltage of the capacitor having the thinnest boron nitride film represented by curve 50 begins to decrease at a greater rate. In other words, the slopes of the curves 50, 52 and 54 are substantially the same constant value except for the curve 50 above 150° C. Considering some inaccuracies in the test measurement, this indicates that the rate of degradation for the thinnest boron nitride film might increase more rapidly above 150° C., whereas no change is apparent in the thicker boron nitride films represented by the curves 52 and 54.

Figure 6:
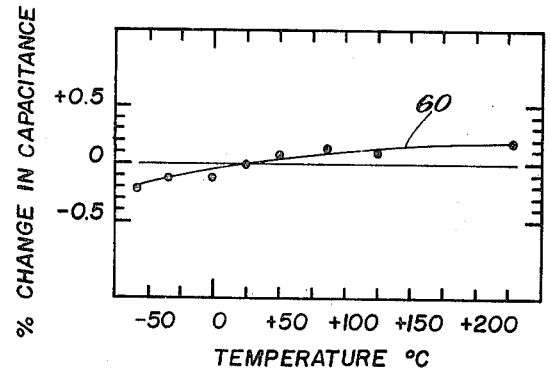
FIGURE 6 is a graph illustrating another operating characteristic of a capacitor constructed in accordance with the present invention.

Referring now to FIGURE 6, the curve 60 represents the percent change in capacitance with respect to temperature of five randomly-selected capacitor assemblies selected from a group constructed by encapsulating a sandwich of molybdenum substrate, metal boride interlayer, boron nitride film and aluminum film electrode in transistor cans or in glass in conventional manner. The assemblies rather uniformly had capacitance values of 320 micro micro farads and 200 volts breakdown. The temperature coefficients calculated from the curve 60 are $-25$ p.p.m./° C. at $-55°$ C., $+17$ p.p.m./° C. at 85° C., $+10$ p.p.m./° C. at 125° C., and $+16$ p.p.m./° C. at 250° C. The overall accuracy of the capacitance measurements are approximately $\pm0.2$ micro micro farads or $\pm5$–$10$ p.p.m./° C. No change in capacitance was detectable between 200 and 250° C. From the above data, it will be evident to those skilled in the art that capacitors constructed in accordance with the present invention have an exceptional temperature stability.

The dissipation factors of a random group of 13 capacitor assemblies were measured to be in the range of 0.01% at 1 kc. The boron nitride capacitors which were carefully encapsulated in glass envelopes did not exhibit any change in the dissipation factor with temperature in the range measured, which was up to 175° C. Other capacitors encapsulated in transistor cans exhibited a slight increase in the dissipation factor, but even these compared very favorably with electrostatic precision units presently on the market.

Figure 8:
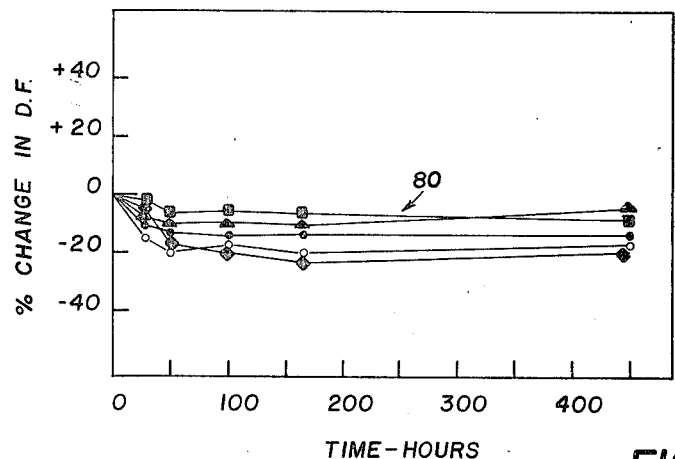
FIGURE 8 is a graph illustrating yet another operating characteristic of the five capacitors constructed in accordance with the present invention.
Figure 2:
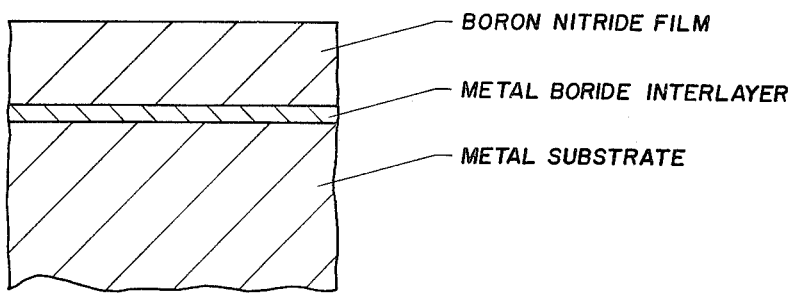
FIGURE 2 is an enlarged, schematic, partial sectional view of an article of manufacture constructed in accordance with this invention which also serves to illustrate the method of the present invention.
Figure 7:
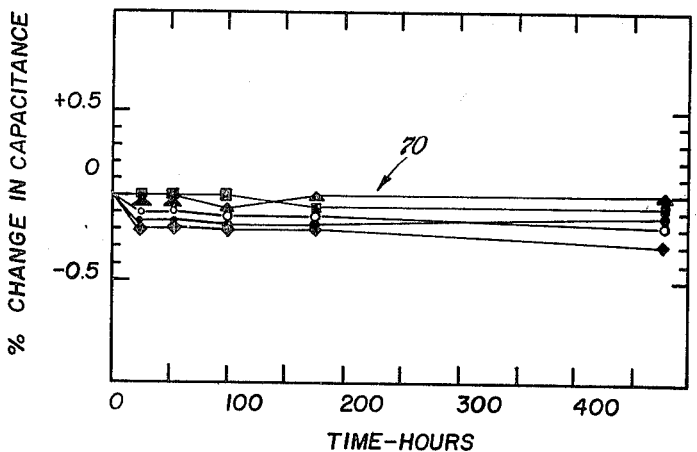
FIGURE 7 is a graph illustrating still another operating characteristic of five capacitors constructed in accordance with the present invention.

Five capacitors constructed in accordance with the present invention were tested over extended periods of time to determine the percent change in capacitance of each and the percent change in the dissipation factor of each. The changes in the capacitance of each of the units are represented by one of the curves indicated collectively by the reference numeral 70 in the graph of FIGURE 7. The changes in the dissipation factors of the corresponding capacitors are represented by the curves indicated collectively by the reference numeral 80 in the graph of FIGURE 8. The graphs include only data obtained over 450 hours, but the units exhibited no further change in capacitance over the period tested which was in excess of 1000 hours. It will be noted that the average capacitance change is approximately the same at 0 volts DC as at 75 volts DC, which indicates that no deterioration is caused by voltage stress. It will be noted in FIGURE 8 that an appreciable change in the dissipation factor occurred during the first 24 hours, but a definite tendency towards stabilization was subsequently exhibited. It is believed that this initial effect was caused primarily by small quantities of moisture remaining in the encapsulation ambient which subsequently dissipated, or may have been caused by electrode deterioration.

Figure 9:
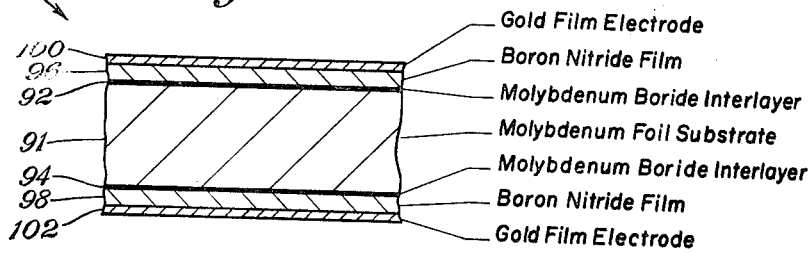
FIGURE 9 is an enlarged partial sectional view of still another capacitor constructed in accordance with the present invention.

The process of the present invention can be used to construct the capacitor indicated generally by the reference numeral 90 in FIGURE 9. A metal foil substrate 91 is placed in a reaction chamber such as the chamber 12, and suitable interlayers 92 and 94 are simultaneously formed on the opposite surfaces of the foil using the process heretofore described. In the particular embodiment illustrated, the substrate 91 is molybdenum and the bonding interlayers are molybdenum boride. Boron nitride films 96 and 98 are then simultaneously deposited upon the metal boride interlayers 92 and 94, respectively, using the process heretofore described. Metallic film electrodes 100 and 102 are then deposited on the boron nitride films by any suitable technique, but preferably by vapor condensation, to produce the multilayer capacitor 90. The metallic films are preferably of a metal different from the substrate 91, such as gold, so that the two metals can be selectively etched. Electrical contact can be made with the electrodes individually and thereby produce two separate capacitors, or the metal film electrodes 100 and 102 can be electrically interconnected to provide a single capacitor having twice the capacitance for a given area of substrate.

Figure 10:
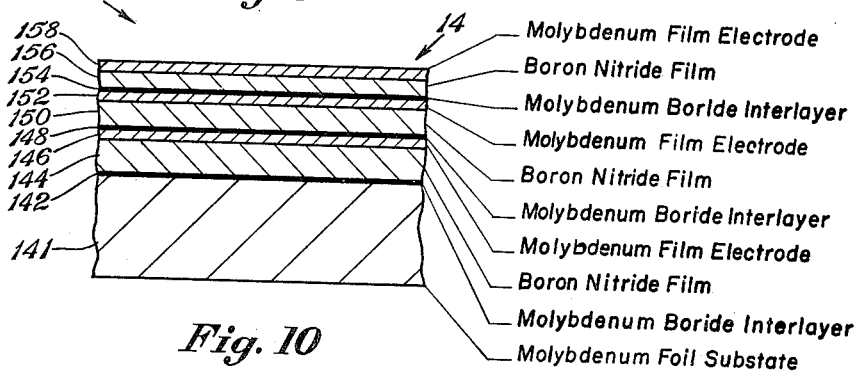
FIGURE 10 is an enlarged partial sectional view of still another capacitor constructed in accordance with the present invention.

Another multilayer capacitor which can be constructed using the process of the present invention is indicated generally by the reference numeral 140 in FIGURE 10. The capacitor 140 is manufactured by placing a metal foil substrate 141, such as molybdenum, in the reaction chamber and successively depositing a metal boride interlayer 142 and a boron nitride film 144 on the substrate using the process steps heretofore described. A metal film electrode 146 is then deposited on the surface of the boron nitride film 144 preferably by conventional vacuum evaporation and condensation techniques. The metal film electrode 146 should be chosen so that boron will react with the metal to form a metal boride interlayer by the above described techniques. Molybdenum may be used for the electrode film. Then a second metal boride interlayer 148, a second boron nitride film 150 and a second metal film electrode 152 are successively deposited upon the metal film electrode 146. This sequence of steps may be repeated any number of times to produce additional dielectric and electrode films such as a third metal boride interlayer 154, a third boron nitride film 156 and a third metal film electrode 158. The second metal film electrode 152 may also be molybdenum, as illustrated, in which case the interlayer 154 would be molybdenum boride. However, it will be appreciated that one of the refractory metals heretofore specified can be used in accordance with the broader aspects of the invention.

An important aspect of the capacitor 140 is that the boron nitride dielectrics 144, 150 and 156 can each be made very thin, yet can be made of different thicknesses so as to provide a variety of capacitances in the same device. For example, the boron nitride film 144 might have the least thickness, the boron nitride film 150 a greater thickness, and the boron nitride film 156 the greatest thickness. The thickness of the boron nitride films can be controlled with considerable accuracy as previously mentioned.

In accordance with another aspect of the present invention, a thin film of dense, pinhole-free boron nitride is adherently bonded to the surface of a substrate metal to which it otherwise could not be bonded by direct application. This is accomplished by first depositing a thin interlayer of a refractory metal as heretofore described, but preferably molybdenum, tungsten, niobium or tantalum, forming a second interlayer by reacting a reagent with the first metal interlayer as heretofore described so as to provide a means for bonding the boron nitride to the refractory metal.

More specifically, the substrate metal may be copper or substantially any alloy of copper particularly suited for high temperature application as an electrical conductor, of which there are many. The first interlayer is preferably molybdenum applied to the substrate by any suitable conventional technique. The second interlayer is preferably molybdenum boride formed by reacting boron with the molybdenum interlayer, and boron nitride is preferably deposited by pyrolysis of a boron and nitrogen bearing compound or compounds on the heated substrate, as heretofore described.

The thin film of refractory metal may be deposited on the surface of a copper or copper alloy substrate using any suitable conventional technique. For example, a molybdenum film may be deposited on the substrate by conventional and well-known evaporation techniques wherein the substrate is positioned in a vacuum chamber and the molybdenum heated until vaporized into the chamber. The substrate is maintained at a relatively low temperature such that the molybdenum vapor will condense on the substrate and form a uniform, dense, thin film of molybdenum. The film of molybdenum should be relatively thin and preferably less than about 2.0 microns in thickness, and more particularly may be as thin as from 100 to 200 angstroms. It is believe that a thin film is desirable because the coefficients of thermal expansion of molybdenum and copper are not particularly well matched and a thick film would be more likely to rupture during thermal cycling.

The interlayer film of molybdenum may also be deposited on the metal substrate by a suitable conventional chemical deposition technique such as, for example, the hydrogen reduction of molybdenum chloride or other halide or metal organic compound vapor. The molybdenum film may also be applied by conventional sputtering or electrochemical deposition techniques.

The second interlayer between the first metal interlayer film and the boron nitride is formed by reacting a reagent with the metal film to form a boride, nitride, oxide or other compound of the metal which will chemically bond with the boron nitride film which is to be subsequently deposited thereon, and more specifically may be formed by reacting boron with the metal film to produce a metal boride interlayer. The metal boride film may be formed by heating the substrate in the presence of boron trichloride vapor as heretofore described. The boron nitride film may be formed by the reaction of boron and nitrogen from suitable source reagents on a heated substrate upon which the first and second interlayers have been formed using the process heretofore described. For example, the boron nitride film may be deposited by the thermal decomposition of beta-trichloroborazole on a heated substrate. Or the boron and nitrogen may be formed from boron trichloride and ammonia. The process of forming the second interlayer on the first metal interlayer and depositing the boron nitride film on the second interlayer can be carried out in a conventional vacuum reaction chamber of the type generally illustrated in FIGURE 1. However, since the substrate is copper, the temperature must be rather closely controlled so as not to exceed the temperature limits of the copper or copper alloy. A temperature from about 700° C. to about 1050° C. is preferred because pure copper melts at 1083° C.

The novel article manufactured by the process is comprised of a body of electrically-conductive metal, preferably copper or a copper alloy, the surface of which is coated by a very thin film of refractory metal, preferably molybdenum, to which a thin film of boron nitride is bonded by an interlayer, preferably a betal boride. The novel article may be fabricated from copper which is recognized as the best electrical conductor for general use because of its high conductivity, abundance and relatively low cost among other reasons. Certain copper alloys have been developed which are well-known and which may be used at temperatures substantially above the maximum useful temperature of pure copper because of higher strength, yet have conductivities approaching that of pure copper. These include dispersion-hardened forms of copper and copper alloys.

From the above description, it will be evident to those skilled in the art that a novel and highly useful process for adherently depositing dense boron nitride films on substrates has been described. A novel article of manufacture results from the process which may be used as an electrical conductor as well as for many other purposes. Further, a novel process has been described for manufacturing single and multilayer capacitors of a size, quality, and character heretofore unobtainable. The boron nitride films deposited by the novel process of this invention ranged in thickness from 0.2 to 5 microns in thickness. The boron nitride films are very uniform and are continuously bonded to the substrate by the interlayer. Boron nitride films 0.5 micron thick deposited upon a 10 mil molybdenum and tantalum wire did not craze when bent at a radius of ⅛ inch. The boron nitride films exhibited a dielectric strength of 200 volts DC per micron of thickness and 5000 volts DC per mil thickness at room temperature. A calculated capacitance of 50,000 micro micro farads per square inch for a 0.5 micron thick boron nitride film was exhibited. The novel process permits very thin films having a marked degree of flexibility to be deposited on a substrate without loss of the density required for high dielectric strength.

The boron nitride insulation films prepared by the above process have superior electrical characteristics, such as dielectric strength and resistivity, even at high temperature. The films are also strongly adherent to the substrate and are sufficiently flexible that coated wire may be used for substantially all conventional purposes. The substrate is chemically stable in a wide variety of corrosive media when coated by the boron nitride. Specifically, the boron nitride films are insoluble in and protect the substrate in the presence of $H_2O$, HCl (dilute and concentrated), $HNO_3$ (dilute and concentrated), $H_2SO_4$ (dilute and concentrated), aqua regia, NaOH, KOH (dilute and concentrated), cryolite mixtures, and HF (dilute and concentrated). The boron nitride films are stable in air up to about 700° C. and protect the copper substrate from oxidation, but are unstable above 800° C. after 30 minutes. Negligible loss of boron nitride by evaporation occurs when the film is held at 900° C. in a vacuum of 0.01 micron of mercury. From the above data relating to the flexibility, insulative properties and chemical stability at elevated temperatures, it will be evident that the strongly adherent, thin boron nitride films are highly useful as insulation in various adverse environments, and the thin insulation films result in significant savings in the space required for windings in motors, transformers and the like.

Although the preferred embodiments have been described in detail, it is to be understood that various changes, substitutions and alterations can be made therein without departing from the spirit and scope of the invention as defined by the appended claims.

What is claimed is:
1. A process for depositing a strongly adherent, dense boron nitride film on a metal substrate in an essentially hydrogen-free atmosphere comprising the steps of:
   reacting boron with the metal substrate to produce a metal boride interlayer on the surface of the substrate, and
   depositing a film of boron nitride on the interlayer by vapor phase deposition of compounds containing boron and nitrogen whereby the interlayer will bond the boron nitride to the metal substrate.

2. A process for depositing a strongly adherent, dense boron nitride film on a metal substrate comprising the steps of:
   forming a metal boride interlayer on the metal by heating the metal in a low pressure atmosphere at a temperature within the range of from about 700° C. to about 900° C. in the presence of a boron halide vapor, and
   forming a boron nitride film on the interlayer by heating the metal to a temperature within the range of from about 700° C. to about 900° C. in a low pressure atmosphere in the presence of reagents containing boron and nitrogen.

3. A process for depositing a strongly adherent, dense boron nitride film on a metal substrate comprising the steps of:
   forming a metal boride interlayer on the metal by heating the metal substrate to a temperature within the range of from about 700° C. to about 900° C. in a low pressure atmosphere in the presence of boron trichloride, and
   forming a boron nitride film on the interlayer by heating the metal substrate to a temperature within the range of from about 700° C. to about 900° C. in a low pressure atmosphere in the presence of beta-trichloroborazole.

4. A process for depositing a strongly adherent, dense boron nitride film on a metal substrate comprising the steps of:
   forming a metal boride interlayer on the metal by heating the metal substrate to a temperature within the range of from about 700° C. to about 900° C. in a low pressure atmosphere in the presence of boron trichloride, and
   forming a boron nitride film on the interlayer by heating the metal substrate to a temperature within the range of from about 700° C. to about 900° C. in a low pressure atmosphere in the presence of boron trichloride and ammonia.

5. A process for depositing a strongly adherent, dense boron nitride film on a metal substrate comprising the steps of:
   placing the metal substrate in a reaction chamber and evacuating the chamber to a low pressure on the order of one micron of mercury,
   filling the chamber with a boron halide vapor to a pressure in the range from about 5 microns to about 500 microns of mercury and heating the substrate to a temperature in the range from about 700° C. to about 900° C. a short period of time to form a metal boride interlayer,
   evacuating the chamber to a low pressure on the order of one micron of mercury,
   filling the chamber with beta-trichloroborazole vapors to a pressure in the range from about 10 microns to about 20 millimeters of mercury and heating the substrate to a temperature in the range from about 700° C. to about 900° C. until a film of boron nitride of the desired thickness is deposited on the interlayer.

6. A process for depositing a strongly adherent, dense boron nitride film on a metal substrate comprising the steps of:
   placing the metal substrate in a reaction chamber and evacuating the chamber to a low pressure on the order of one micron of mercury,
   filling the chamber with a boron halide vapor to a pressure from about 5 microns to about 500 microns of mercury and heating the substrate to a temperature in the range from about 700° C. to about 900° C. for a short period of time to form a metal boride interlayer,
   evacuating the chamber to a low pressure on the order of one micron of mercury,
   filling the chamber with boron trichloride and ammonia vapors to a pressure from about 10 microns to about 20 millimeters of mercury and heating the substrate to a temperature from about 700° C. to about 900° C. until a film of boron nitride of the desired thickness is deposited on the interlayer.

7. A process for adherently applying a film of boron nitride to the surface of a copper or a copper alloy substrate comprising the steps of:
   depositing a first interlayer film of refractory metal on the surface of the substrate,
   forming a second interlayer film of metal boride over the surface of the refractory metal film by reacting boron with the refractory metal in a low pressure atmosphere at a temperature within the range of from about 700° C. to about 900° C., and
   depositing boron nitride on the second interlayer film in a low pressure atmosphere at a temperature within the range of from about 700° C. to about 900° C., to produce a dense, thin insulating film adherently bonded to the substrate.

8. A process for adherently applying an insulating film of boron nitride to the surface of a copper or copper alloy conductor comprising the steps of:
   depositing a first interlayer film of molybdenum on the surface of the conductor,
   forming a molybdenum boride interlayer film by reacting boron with the molybdenum in a low pressure atmosphere at a temperature within the range of from about 700° C. to about 900° C., and
   forming a boron nitride film on the molybdenum interlayer film by heating the substrate in a low pressure atmosphere at a temperature within the range of from about 700° C. to about 900° C. in the presence of a reagent containing boron and nitrogen.

9. A process as defined in claim 8 wherein the conductor is heated in the presence of beta-trichloroborazole.

10. A process as defined in claim 8 wherein the conductor is heated in the presence of boron trichloride and ammonia.

11. A process as defined in claim 8 wherein the molybdenum boride second interlayer film is formed by heating the first interlayer film in the presence of boron trichloride.

12. A process as defined in claim 8 wherein:
    the first interlayer film is less than about two microns in thickness.

13. A process as defined in claim 8 wherein:
    the first interlayer film is from about 100 angstroms to about 200 angstroms thick.

14. A process for adherently applying a film of boron nitride to the surface of a copper or copper alloy conductor comprising the steps of:
    adherently depositing a first interlayer film of moybdenum on the surface of the conductor,
    forming a second interayer film of molybdenum boride on the first interlayer film by heating the first interlayer film to a temperature from about 700° C. to about 900° C. in the presence of a boron halide vapor having a pressure of from about 5 microns to about 500 microns of mercury for a short period of time to form a metal boride interlayer, and
    adherently depositing an insulating film of boron nitride on the second interlayer film by heating the second interlayer film to a temperature in the range from about 700° C. to about 900° C. in the presence of beta-trichloroborazole vapors at a pressure in the range from about 10 microns to about 20 millimeters of mercury until a film of boron nitride of the desired thickness is deposited on the interlayer.

15. A process for adherently applying a film of boron nitride to the surface of a copper conductor comprising the steps of:
   adherently depositing a first interlayer film of molybdenum on the surface of the conductor,
   forming a second interlayer film of molybdenum boride on the first interlayer film by heating the first interlayer film to a temperature from about 700° C. to about 900° C. in the presence of a boron halide vapor having a pressure of from about 5 microns to about 500 microns of mercury for a short period of time to form a metal boride interlayer, and
   adherently depositing an insulating film of boron nitride on the second interlayer film by heating the second interlayer film to a temperature in the range from about 700° C. to about 900° C. in the presence of boron trichloride and ammonia vapors at a pressure in the range from about 10 microns to about 20 millimeters of mercury until a film of boron nitride of the desired thickness is deposited on the interlayer.

16. An article of manufacture comprising:
   a molybdenum substrate having a film of dense boron nitride bonded to a selected portion of the surface of the molybdenum substrate by an interlayer of molybdenum boride and a metallic film deposited on a selected portion of the boron nitride film.

17. The article according to claim 16 wherein said metallic film is an aluminum film.

18. An article of manufacture comprising a molybdenum substrate having on two opposing surfaces films of dense boron nitride bonded to selected portions of said molybdenum substrate by interlayers of molybdenum boride, and metallic films deposited on selected portions of said boron nitride films.

19. The article according to claim 18 wherein said metallic film is a gold film.

References Cited

UNITED STATES PATENTS

| | | | |
|---|---|---|---|
| 2,823,151 | 2/1958 | Yntema et al. | |
| 3,212,926 | 10/1965 | Morelock | 117—106 |
| 3,321,337 | 5/1967 | Patterson | 148—6.3 |
| 3,359,468 | 12/1967 | Patterson et al. | 117—217 X |

FOREIGN PATENTS

| | | |
|---|---|---|
| 885,632 | 12/1961 | Great Britain. |
| 908,860 | 10/1962 | Great Britain. |

RALPH S. KENDALL, Primary Examiner

U.S. Cl. X.R.

117—106, 217; 148—6.31